US010012945B2

(12) United States Patent
Hanamoto (10) Patent No.: US 10,012,945 B2
(45) Date of Patent: Jul. 3, 2018

(54) OPENING AND CLOSING DEVICE AND IMAGE SCANNER UNIT (71) Applicant: KYOCERA Document Solutions Inc., Osaka (JP)

(72) Inventor: Katsuhiko Hanamoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 26 days.

(21) Appl. No.: 15/260,913

(22) Filed: Sep. 9, 2016

(65) Prior Publication Data

US 2017/0090401 A1    Mar. 30, 2017

(30) Foreign Application Priority Data

Sep. 25, 2015 (JP) ................. 2015-188806

(51) Int. Cl.
G03G 15/00 (2006.01)
G03G 21/16 (2006.01)
H04N 1/00 (2006.01)
F16C 11/06 (2006.01)

(52) U.S. Cl.
CPC ......... G03G 21/1628 (2013.01); G03G 15/60 (2013.01); G03G 21/1647 (2013.01); F16C 11/0661 (2013.01); H04N 1/00554 (2013.01)

(58) Field of Classification Search
CPC .. F16C 11/00; F16C 11/0661; G03G 21/1628; H04N 1/00554
See application file for complete search history.

(56) References Cited

U.S. PATENT DOCUMENTS 6,327,457 B1 * 12/2001 Hashimoto .......... G03G 15/605
                                                     355/75
6,775,513 B2    8/2004 Hata et al.
2003/0049061 A1  3/2003 Hata et al.

FOREIGN PATENT DOCUMENTS

JP    2003-087463 A      3/2003
JP    2008-240927 A     10/2008
JP     2008240927 A *   10/2008

* cited by examiner

Primary Examiner — Matthew G Marini
Assistant Examiner — Quang X Nguyen
(74) Attorney, Agent, or Firm — IP Business Solutions, LLC (57) ABSTRACT A base portion includes a cam surface formed around a support pin. A turning portion includes: a slide member provided movably in directions toward and away from the support pin; and a coil spring urging the slide member. The slide member is designed to slide on the cam surface while turning, together with an openable body, about the support pin. The cam surface includes a first sliding surface, a second sliding surface, and a third sliding surface. The first sliding surface presses the slide member back in a direction of closing of the openable body. The second sliding surface presses the slide member back in a direction of opening of the openable body. The third sliding surface presses the slide member back in the direction of closing of the openable body.

6 Claims, 8 Drawing Sheets

OPENING AND CLOSING DEVICE AND IMAGE SCANNER UNIT

INCORPORATION BY REFERENCE

This application claims priority to Japanese Patent Application No. 2015-188806 filed on Sep. 25, 2015, the entire contents of which are incorporated by reference herein.

BACKGROUND

The present disclosure relates to opening and closing devices for openable bodies and image scanner units and particularly relates to a technique for assisting the opening and closing operation of an openable body.

As an example of an opening and closing device for assisting the opening and closing operation of an openable body, there is known an opening and closing device A including: a mounting member provided on a unit body of a unit; and a support member provided on an opening/closing member of the unit, wherein the support member is pivotally supported by a hinge pin from the mounting member, so that the opening/closing member is supported from the unit body so as to be openable and closable with respect to the unit body. Furthermore, this opening and closing device A is designed so that when a cam follower provided on the support member is pressed against a cam provided on the mounting member, a reaction force on the support member causes the opening/closing member to be held open against a moment in a direction of closing of the opening/closing member due to its own weight. Moreover, when the opening/closing member is opened to its maximum opening angle, the support member abuts on a stopper to restrict the opening angle of the opening/closing member.

As another example of the opening and closing device, there is known an opening and closing device B for supporting a document feeder from an image scanner unit by a hinge so that the document feeder can be opened and closed with respect to the image scanner unit. This hinge includes a fixed member provided on the image scanner unit, a movable member provided on the document feeder, and a pin supporting the movable member pivotally from the fixed member. Furthermore, the hinge is designed so that when the document feeder is opened largely, the movable member abuts on a stopper of the fixed member to restrict the opening angle of the document feeder.

SUMMARY

A technique improved over the aforementioned techniques is proposed as one aspect of the present disclosure.

An opening and closing device according to an aspect of the present disclosure includes a base portion, a turning portion, and a support pin.

The base portion is provided at a unit body.

The turning portion is attached to an openable body pivotally mounted to the unit body.

The support pin supports the turning portion pivotally from the base portion to serve as a fulcrum for opening and closing the openable body with respect to the unit body.

The base portion further includes a cam surface formed around the support pin.

The turning portion includes: a slide member provided movably in directions toward and away from the support pin; and an urging member urging the slide member to press the slide member against the cam surface.

The slide member slides on the cam surface while turning, together with the openable body, about the support pin.

The cam surface includes: a first sliding surface to be pressed against the slide member in a range from a closed position of the openable body where the openable body is closed with respect to the unit body to a first turning angle to which the openable body has turned about the support pin from the unit body toward a fully open position of the openable body; a second sliding surface to be pressed against the slide member in a range from the first turning angle to a second turning angle to which the openable body has further turned toward the fully open position; and a third sliding surface to be pressed against the slide member in a range from the second turning angle to a third turning angle at which the openable body has turned to the fully open position.

The first sliding surface presses the slide member back in a direction of closing of the openable body, the second sliding surface presses the slide member back in a direction of opening of the openable body, and the third sliding surface presses the slide member back in the direction of closing of the openable body.

An image scanner unit according to another aspect of the present disclosure includes a scanning section and a document feed section.

The scanning section scans an original document. The scanning section is the unit body with which the above-described opening and closing device is used.

The document feed section holds the original document placed on the scanning section. The document feed section is the openable body with which the above-described opening and closing device is used.

DETAILED DESCRIPTION

Hereinafter, a description will be given of an embodiment of the present disclosure with reference to the drawings.

Figure 1:
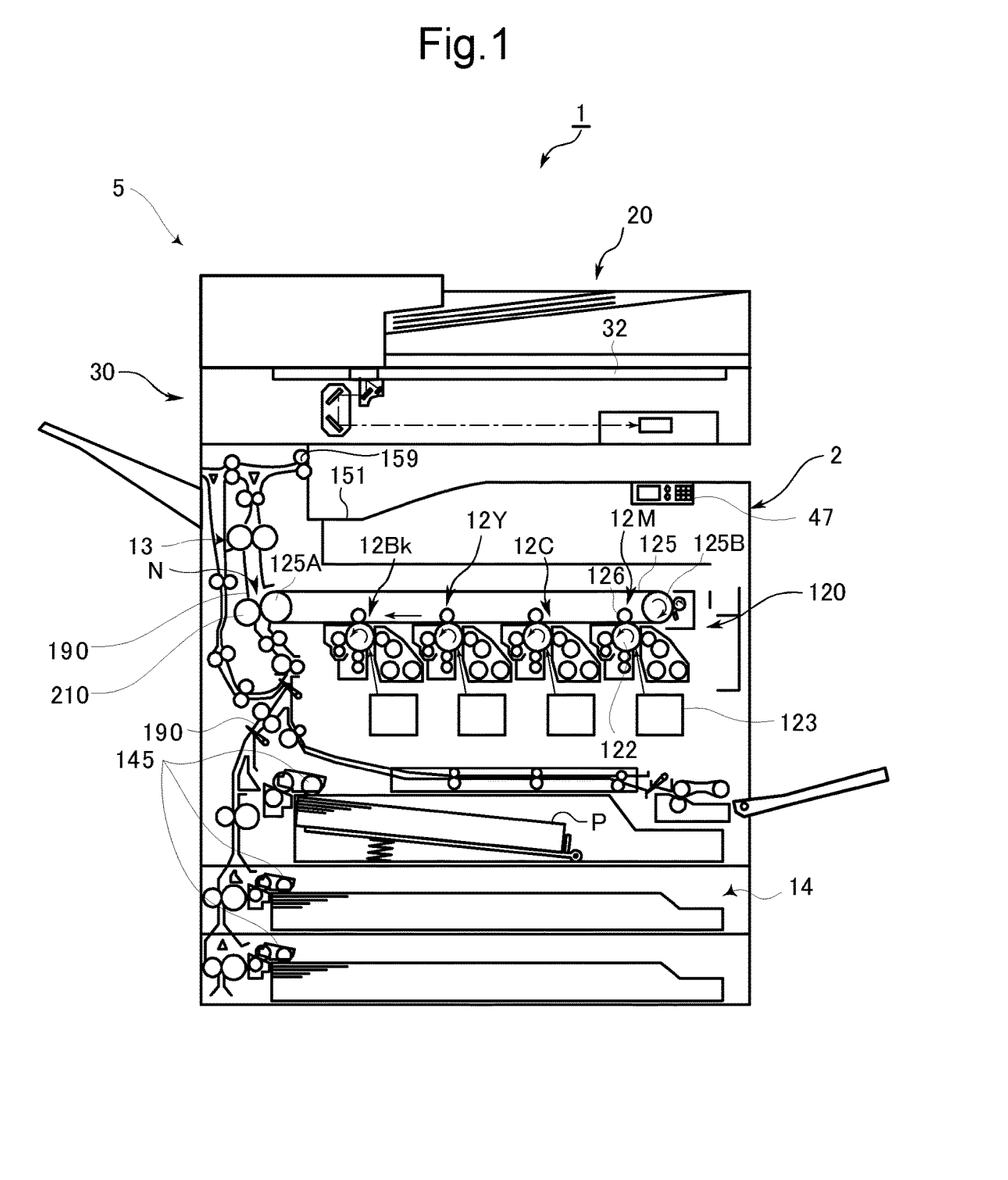
FIG. 1 is a cross-sectional view showing an image forming apparatus including an image scanner unit according to one embodiment of the present disclosure.

FIG. 1 is a front cross-sectional view showing the structure of an image forming apparatus according to one embodiment of the present disclosure. The image forming apparatus 1 of this embodiment is a multifunction peripheral having, for example, a copy function, a print function, a scan function, a facsimile function, and so on. This image forming apparatus 1 is made up so that an apparatus body 2 includes an operating section 47, an image forming section 120, a fixing section 13, a sheet feed section 14, an image scanner unit (ISU) 5, and so on.

The operating section 47 is operated by a user and accepts, according the user's operation, instructions to perform an image forming operation, an image scanning operation, and so on.

In performing the image scanning operation, the ISU 5 optically scans an image of an original document and generates image data from the scanned image. The image data generated by the ISU 5 is stored on an internal HDD, a network-connected computer or the like.

In performing the image forming operation, the image forming section 120 forms a toner image on a recording paper sheet P serving as a recording medium fed from the sheet feed section 14, based on image data generated by the above image scanning operation, image data received from the network-connected computer or a user terminal device, such as a smartphone, image data stored on the internal HDD, or other image data.

The image forming section 120 includes an image forming unit 12M for magenta, an image forming unit 12C for cyan, an image forming unit 12Y for yellow, and an image forming unit 12Bk for black. Each of the image forming units 12M, 12C, 12Y, and 12Bk includes a photosensitive drum 122, a charging device operable to uniformly charge the surface of the photosensitive drum 122, a laser scanning unit (LSU) 123 operable to expose the surface of the photosensitive drum 122 to laser light to form an electrostatic latent image on the surface thereof, a developing device operable to develop the electrostatic latent image on the surface of the photosensitive drum 122 into a toner image using toner, and a primary transfer roller 126.

In performing color printing, the image forming units 12M, 12C, 12Y, and 12Bk uniformly charge the surfaces of their respective photosensitive drums 122, then expose them to laser light to form respective electrostatic latent images corresponding to images of their color components on the surfaces, develop the electrostatic latent images on the surfaces of the photosensitive drums 122 with the developing devices to form respective toner images of their color components on the photosensitive drums 122, and then allow their respective primary transfer rollers 126 to primarily transfer the toner images to an intermediate transfer belt 125 mounted around a drive roller 125A and a driven roller 125B.

The intermediate transfer belt 125 has an outside surface designed to serve as an image carrying surface on which toner images are to be transferred and can be driven in engagement against the peripheral surfaces of the photosensitive drums 122 by the drive roller 125A. The intermediate transfer belt 125 can travel in an endless path between the drive roller 125A and the driven roller 125B while synchronizing with each photosensitive drum 122.

The toner images of different color components transferred to the intermediate transfer belt 125 are superposed each other on the intermediate transfer belt 125 by controlling their transfer timings, resulting in a multicolor toner image. A secondary transfer roller 210 secondarily transfers the multicolor toner image formed on the surface of the intermediate transfer belt 125, at a nip N between the secondary transfer roller 210 and the intermediate transfer belt 125, to a recording paper sheet P conveyed from the sheet feed section 14 along a conveyance path 190.

Thereafter, the fixing section 13 applies heat and pressure to the recording paper sheet P, thus fixing the toner image on the recording paper sheet P by heat and pressure. Then, the recording paper sheet P is discharged through an output roller pair 159 to a sheet output tray 151.

The sheet feed section 14 includes a plurality of sheet feed cassettes. When any one of the sheet feed cassettes is specified by a user's operation of the operating section 47, a pick-up roller 145 of this sheet feed cassette is driven into rotation, so that a recording paper sheet P in the sheet feed cassette is conveyed and fed to the conveyance path 190.

Figure 2:
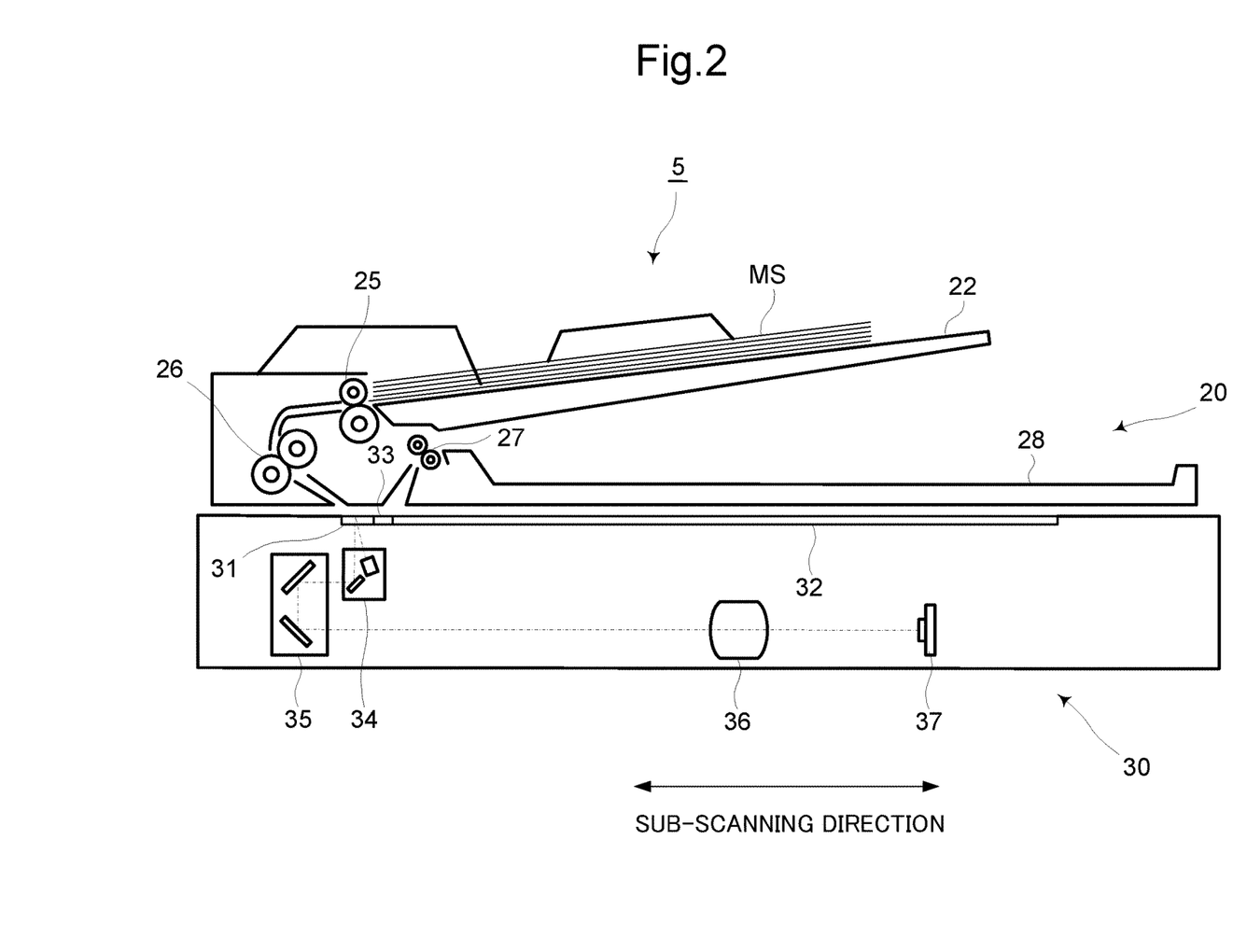
FIG. 2 is a cross-sectional view showing the image scanner unit.

Next, a description will be given of a schematic structure of the image scanner unit (ISU) 5. FIG. 2 is a cross-sectional view showing a mechanical structure of the ISU 5. Furthermore, FIG. 3 is a perspective view showing the appearance of the ISU 5 and shows a state where a document feed section 20 (an example of the openable body defined in What is claimed is) is open.

Figure 3:
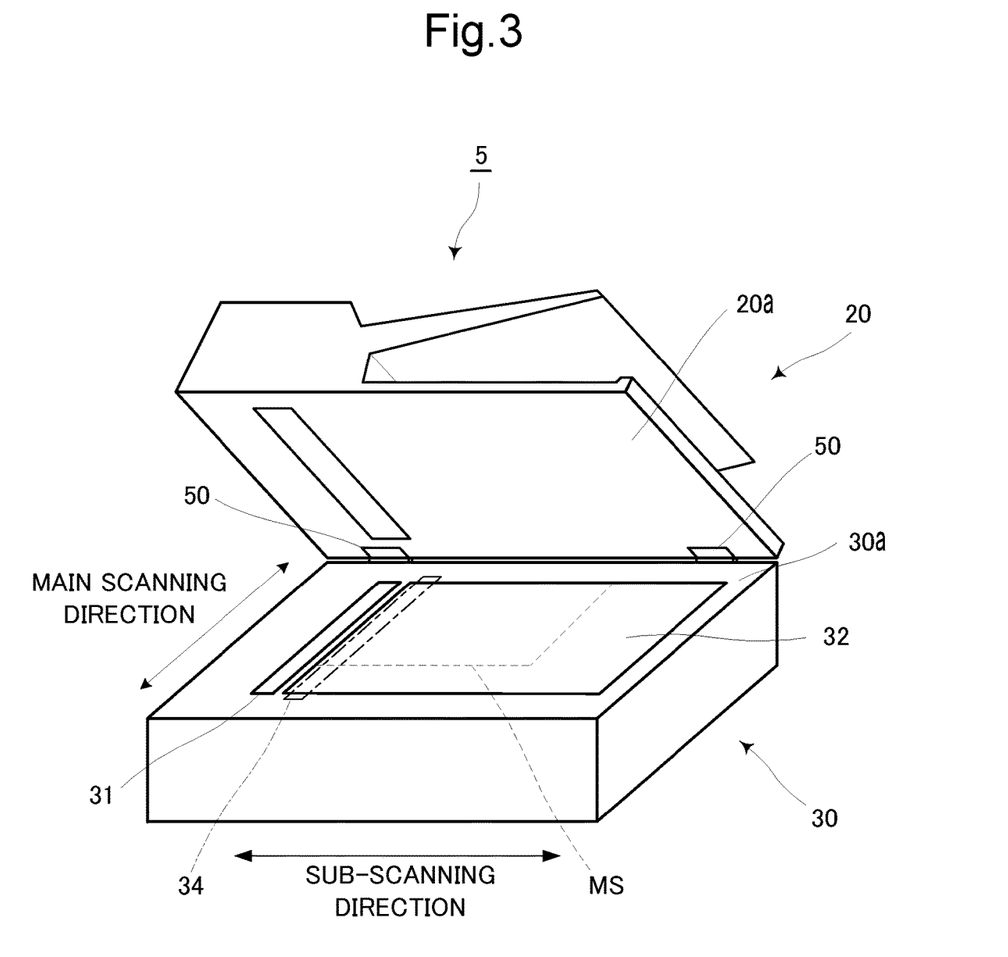
FIG. 3 is a perspective view showing the appearance of the image scanner unit and shows a state where a document feed section is open.

As shown in FIGS. 2 and 3, the ISU 5 includes the document feed section 20 and a scanning section 30. The document feed section 20 includes a document feed tray 22, a pick-up roller 25, a conveyance roller 26, a sheet discharge roller 27, a document discharge dray 28, and so on. Furthermore, the scanning section 30 includes a first platen glass 31, a second platen glass 32, a white reference plate 33, a carriage 34, an optical system unit 35, a condensing lens 36, a charge coupled device (CCD) sensor 37, and so on.

Two opening and closing devices 50 of this embodiment are provided spaced apart from each other at one end of the top surface 30a of the scanning section 30. The document feed section 20 is pivotally supported by these opening and closing devices 50 so that the user can operate to open and close the document feed section 20 with respect to the scanning section 30.

In a state where the document feed section 20 is closed, original documents MS placed on the document feed tray 22 are pulled sheet by sheet and conveyed to pass over the first platen glass 31 of the scanning section 30. On the other hand, in a state where the document feed section 20 is open, the first platen glass 31 and the second platen glass 32 of the scanning section 30 are opened to the outside, so that an original document MS can be placed on the second platen glass 32 of the scanning section 30. When the document feed section 20 is then closed, the original document MS placed on the second platen glass 32 is held by the document feed section 20. The scanning section 30 optically scans an original document MS being conveyed by the document feed section 20 and passing over the first platen glass 31 or an original document MS placed on the second platen glass 32.

Each opening and closing device 50 functions as a hinge pivotally supporting the document feed section 20 so that the document feed section 20 can be opened and closed with respect to the scanning section 30. In addition, when the document feed section 20 is closed, the opening and closing device 50 urges the document feed section 20 toward closing it to stably keep the closed state of the document feed section 20. Furthermore, when the document feed section is half open, each opening and closing device 50 urges the document feed section 20 toward opening it to maintain the turning angle of the document feed section 20 against a moment in the direction of closing of the document feed section 20 due to its own weight, thus keeping the half-open state of the document feed section 20. Moreover, just before the document feed section 20 is fully opened to a fully open state, each opening and closing device 50 urges the document feed section 20 toward closing it to restrain the turning movement of the document feed section 20 in the direction of opening, thus lessening the impact caused on full opening of the document feed section 20.

Figure 4A:
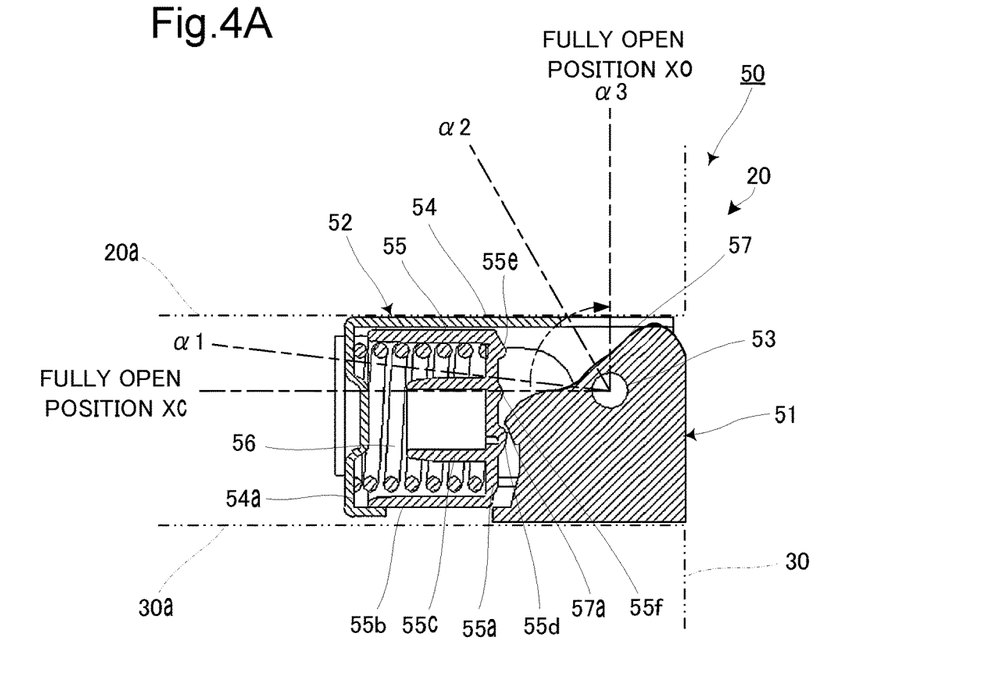
FIG. 4A is a partly cross-sectional view showing an opening and closing device according to the embodiment as viewed from laterally.
Figure 4B:
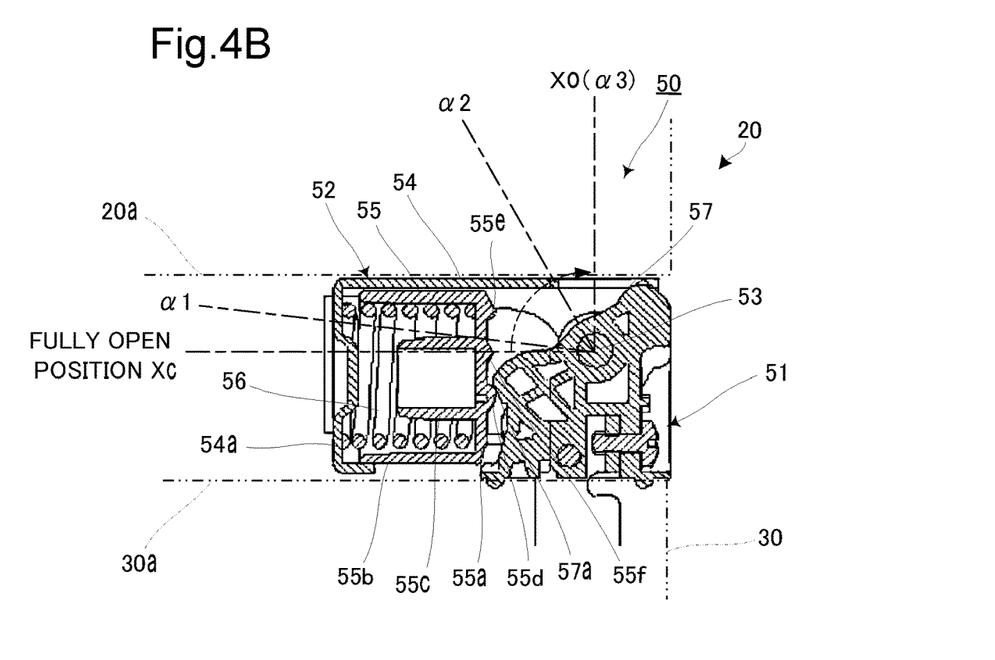
FIG. 4B is a longitudinal cross-sectional view showing the opening and closing device.

Next, a detailed description will be given of the opening and closing device 50 of this embodiment. FIG. 4A is a partly cross-sectional view showing the opening and closing device 50 as viewed from laterally and FIG. 4B is a longitudinal cross-sectional view showing the opening and closing device 50. As shown in FIGS. 4A and 4B, the opening and closing device 50 includes a base portion 51 fixed at one end of the top surface 30a of the scanning section 30, a turning portion 52 fixed at one end of the under surface 20a of the document feed section 20, and a support pin 53 supporting the turning portion 52 pivotally from the base portion 51 to serve as a fulcrum for opening and closing the document feed section 20 with respect to the scanning section 30. When a front end portion of the document feed section 20 is moved up and down by the user, the turning portion 52 attached to the document feed section 20 turns about the support pin 53, so that the document feed section 20 is opened and closed with the support pin 53 as the center of opening and closing movements.

Figure 5:
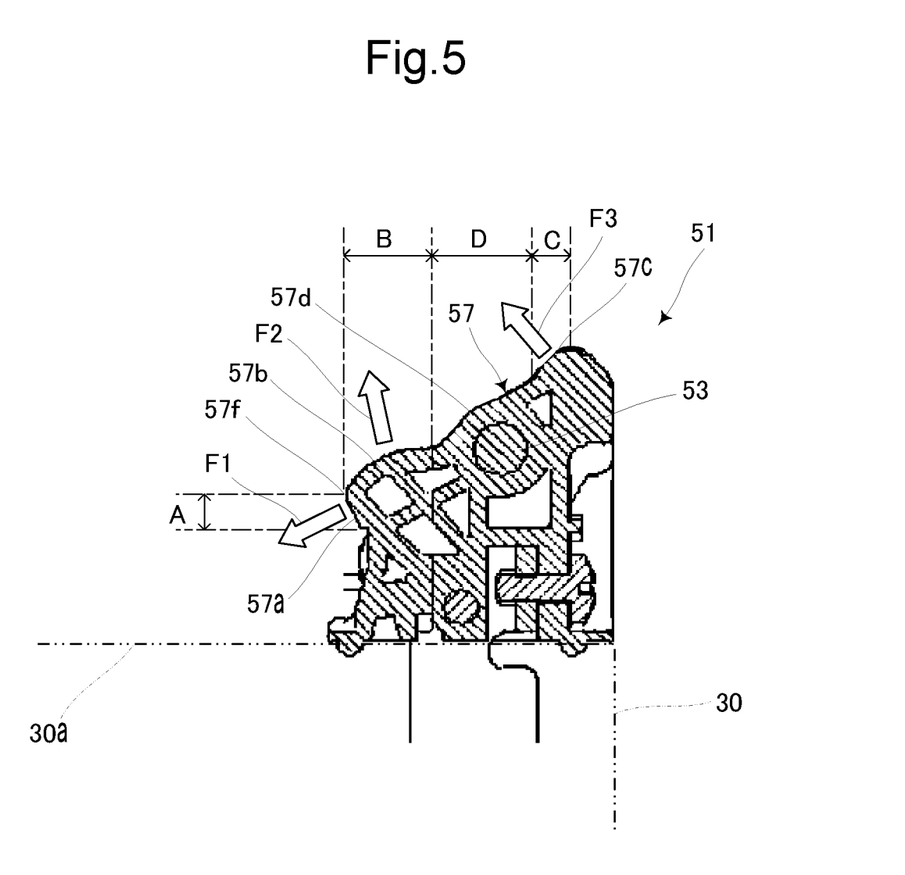
FIG. 5 is a longitudinal cross-sectional view showing a base portion of the opening and closing device.

The base portion 51 includes a cam surface 57 formed around the support pin 53. FIG. 5 is a longitudinal cross-sectional view showing the base portion 51. As shown in FIG. 5, the cam surface 57 includes: a first sliding surface 57a oriented obliquely downward in a region A; a second sliding surface 57b oriented obliquely upward or upward in a region B; a third sliding surface 57c oriented obliquely upward and steeply rising in a region C, and a fourth sliding surface 57d oriented obliquely upward in a region D. In FIG. 5, the first sliding surface 57a and the second sliding surface 57b are located to the left of and away from the support pin 53, the third sliding surface 57c is located to the right of and away from the support pin 53, and the fourth sliding surface 57d is located in the vicinity of the support pin 53. In other words, in side view from the direction of extension of the support pin 53, the first and second sliding surfaces 57a, 57b are disposed on one side of the support pin 53 in the direction of turning of the turning portion 53 and the third sliding surface 57c is disposed on the other side of the support pin 53 in the direction of turning of the turning portion 53. The fourth sliding surface 57d is provided between the second sliding surface 57b and the third sliding surface 57c in the direction of turning of the turning portion 52 and has a slope connecting between the second sliding surface 57b and the third sliding surface 57c in the side view.

Furthermore, as shown in FIGS. 4A and 4B, the turning portion 52 includes a cylindrical frame 54 supported by the support pin 53 pivotally from the base portion 51, a slide member 55 supported in the cylindrical frame 54 slidably on an inside surface of the cylindrical frame 54 in directions toward and away from the support pin 53, and a coil spring 56 serving as a pressure spring urging the slide member 55 toward the support pin 53 to press the slide member 55 against the cam surface 57. The cylindrical frame 54 is a frame forming a main body of the turning portion 52 and supports the slide member 55 and the coil spring 56 therein. The slide member 55 includes a disc-like bottom plate 55a, an outer cylindrical body 55b extended from the peripheral edge of the bottom plate 55a, and an inner cylindrical body 55c located inwardly of the outer cylindrical body 55b and extended from the bottom plate 55a. Furthermore, the bottom surface of the bottom plate 55a is provided with a first raised portion 55d, a second raised portion 55e, and a third raised portion 55f, all projecting toward the support pin 53. In other words, an end surface of the slide member 55 facing the cam surface 57 is provided with the third raised portion 55f formed between the first raised portion 55d and the second raised portion 55e in side view from the direction of extension of the support pin 53. The coil spring 56 is inserted at one end between the outer cylindrical body 55b and the inner cylindrical body 55c of the slide member 55 and compressively confined between the bottom plate 55a of the slide member 55 and an end plate 54a of the cylindrical frame 54.

Figure 6:
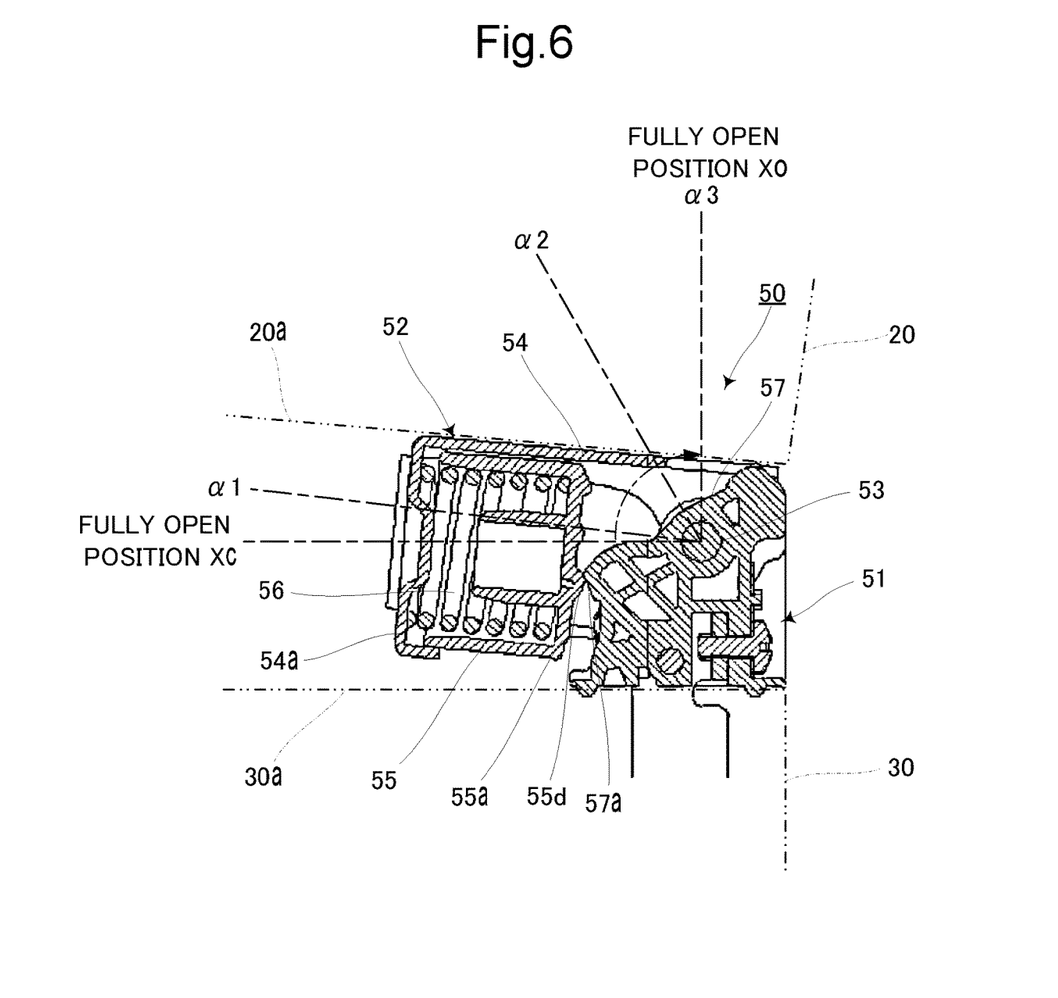
FIG. 6 is a longitudinal cross-sectional view showing the opening and closing device when the document feed section is slightly opened.
Figure 7:
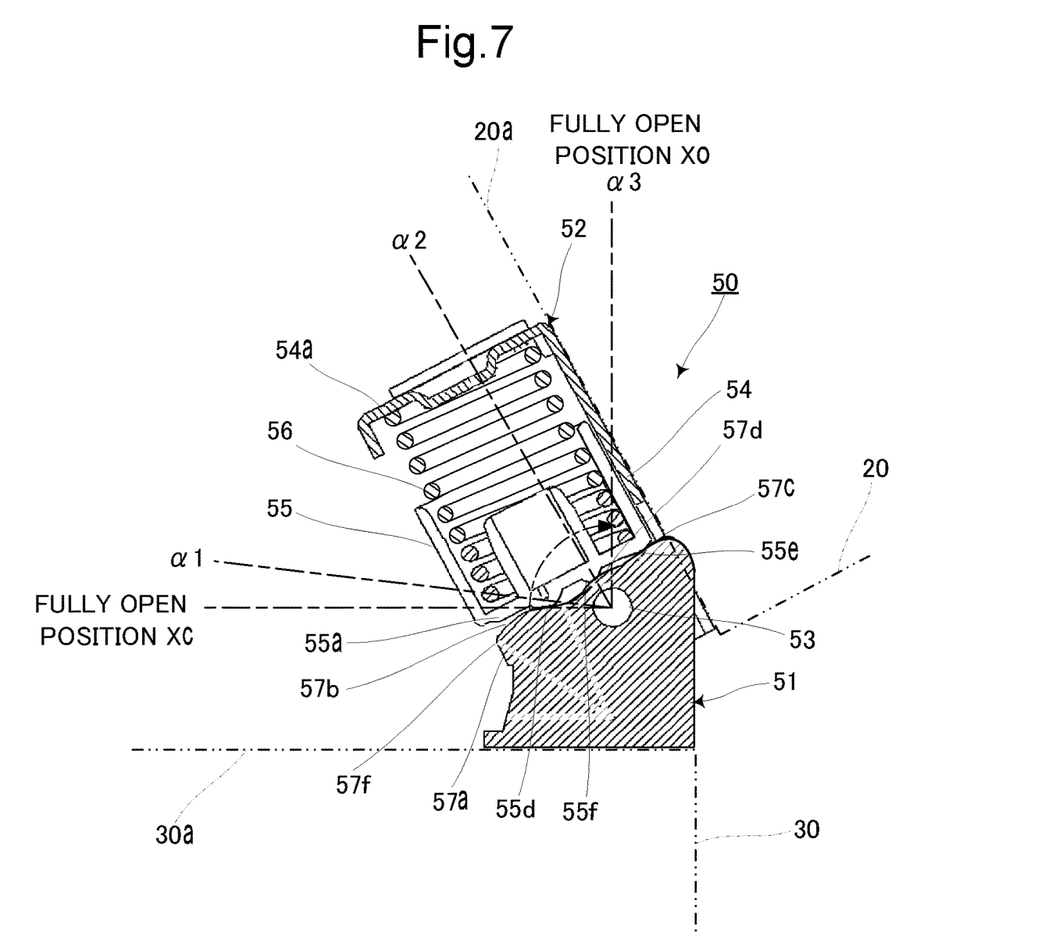
FIG. 7 is a partly cross-sectional view showing the opening and closing device when the document feed section is half open.
Figure 8:
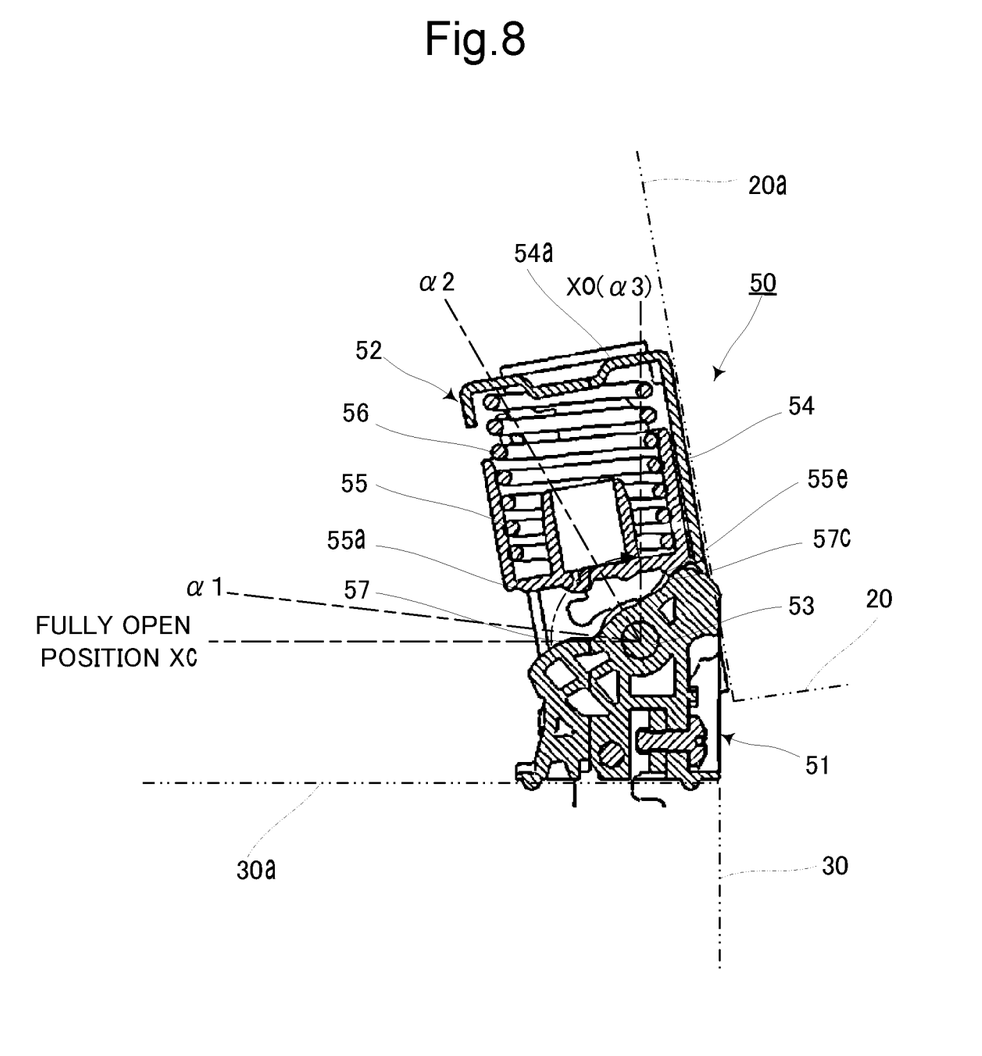
FIG. 8 is a longitudinal cross-sectional view showing the opening and closing device just before the document feed section is fully opened.

A detailed description will be given of the opening and closing actions of the opening and closing device 50 having the above structure with reference to FIGS. 4 to 8. FIGS. 6 and 8 are longitudinal cross-sectional views showing the opening and closing device 50 and FIG. 7 is a partly cross-sectional view showing the opening and closing device 50. Furthermore, FIGS. 4A and 4B show the opening and closing device 50 when the document feed section 20 is closed, FIG. 6 shows the opening and closing device 50 when the document feed section 20 is slightly opened, FIG. 7 shows the opening and closing device 50 when the document feed section 20 is half open, and FIG. 8 shows the opening and closing device 50 just before the document feed section 20 is fully opened.

First, as shown in FIGS. 4A and 4B, when the document feed section 20 is closed, the document feed section 20 is in a closed position Xc. At this time, the bottom plate 55a of the slide member 55 of the turning portion 52 is approximately vertical, so that the first raised portion 55d of the bottom plate 55a abuts on the first sliding surface 57a of the cam surface 57. Furthermore, because the point of abutment of the first raised portion 55d of the bottom plate 55a on the first sliding surface 57a of the cam surface 57 is located away from the support pin 53, the bottom plate 55a of the slide member 55 is kept away from the support pin 53 by the first sliding surface 57a and the coil spring 56 confined between the bottom plate 55a of the slide member 55 and the end plate 54a of the cylindrical frame 54 is further compressed. An urging force of this compressed coil spring 56 causes the first raised portion 55d of the bottom plate 55a of the slide member 55 to be strongly pressed against the first sliding surface 57a of the cam surface 57.

In addition, since the first sliding surface 57a is oriented obliquely downward as shown in FIG. 5, the first raised portion 55d is subjected to an obliquely downward reaction force shown in the arrow F1. Moreover, the first sliding surface 57a is located to the left of the support pin 53. Therefore, the turning portion 52 is acted on by a counterclockwise moment about the support pin 53 and thus urged counterclockwise, so that the document feed section 20 is also urged counterclockwise. Hence, the document feed section 20 is urged toward closing, so that the closed state of the document feed section 20 can be stably maintained.

As shown in FIG. 6, even when the document feed section 20 is slightly opened and the turning angle of the document feed section 20 is within a range from the closed position Xc to a first turning angle α1 about the support pin 53, the first raised portion 55d of the bottom plate 55a of the slide member 55 abuts on the first sliding surface 57a of the cam surface 57, so that the turning portion 52 is urged counterclockwise. Therefore, the document feed section 20 is immediately closed. The first turning angle α1 is an angle indicating a position of the document feed section 20 when the document feed section 20 has turned a certain degree about the support pin 53 from the closed position thereof where it is closed with respect to the scanning section 30 toward a fully open position thereof where it is fully opened with respect to the scanning section 30.

Next, when the document feed section 20 is further opened, so that the turning angle of the document feed section 20 exceeds the first turning angle α1 about the support pin 53, the first raised portion 55d of the slide member 55 of the turning portion 52 goes over an apex 57f between the first sliding surface 57a and the second sliding surface 57b of the cam surface 57 and slides on the second sliding surface 57b.

Furthermore, the first raised portion 55d of the slide member 55 of the turning portion 52 continues to slide on the second sliding surface 57b of the cam surface 57 until the turning angle of the document feed section 20 reaches a second turning angle α2 about the support pin 53 as shown in FIG. 7. The second turning angle α2 is an angle indicating a position of the document feed section 20 when the document feed section 20 has further turned a certain degree about the support pin 53 from the position of the first turning angle α1 toward the fully open position with respect to the scanning section 30.

Therefore, after the turning angle of the document feed section 20 exceeds the first turning angle α1 and before reaching the second turning angle α2, i.e., while the document feed section 20 is half open, the first raised portion 55d of the slide member 55 slides on the second sliding surface 57b of the cam surface 57.

Also when the document feed section 20 is half open, the coil spring 56 is compressed between the bottom plate 55a of the slide member 55 and the end plate 54a of the cylindrical frame 54. Thus, an urging force of this compressed coil spring 56 causes the first raised portion 55d of the bottom plate 55a of the slide member 55 to be pressed against the second sliding surface 57b of the cam surface 57.

Furthermore, since the second sliding surface 57b is oriented obliquely upward or upward as shown in FIG. 5, the first raised portion 55d is subjected to an obliquely upward or upward reaction force shown in the arrow F2. Moreover, the second sliding surface 57b is located to the left of the support pin 53. Therefore, the turning portion 52 is acted on by a clockwise moment about the support pin 53 and thus urged clockwise, so that the document feed section 20 is also urged clockwise. Thus, the turning angle of the document feed section 20 is approximately maintained against a moment in the (counterclockwise) direction of closing of the document feed section 20 due to its own weight, thus keeping the half-open state of the document feed section 20. In other words, even when the operation for opening the document feed section 20 is stopped halfway, the document feed section 20 is kept at a turning angle when the operation is stopped.

Next, as shown in FIG. 7, when the turning angle of the document feed section 20 reaches the second turning angle α2, the bottom plate 55a of the slide member 55 comes close to the support pin 53, so that the degree of compression of the coil spring 56 between the bottom plate 55a of the slide member 55 and the end plate 54a of the cylindrical frame 54 is reduced, thus reducing the clockwise moment acting on the turning portion 52 based on the urging force of the coil spring 56. At this time, not only the first raised portion 55d of the slide member 55 abuts on the second sliding surface 57b of the cam surface 57, but also the second raised portion 55e of the slide member 55 abuts on an end of the third sliding surface 57c of the cam surface 57 and the third raised portion 55f of the slide member 55 abuts on the fourth sliding surface 57d of the cam surface 57. Therefore, the slide member 55 abuts at three points on the cam surface 57 and the turning portion 52 is supported at the three points, so that the turning angle of the document feed section 20 is surely maintained, thus stably keeping the half-open state of the document feed section 20.

Next, when the document feed section 20 is further opened to exceed the second turning angle α2 about the support pin 53 but before the turning angle of the document feed section 20 reaches a third turning angle α3 corresponding to the fully open position Xo of the document feed section 20, the second raised portion 55e of the slide member 55 of the turning portion 52 slides on the third sliding surface 57c of the cam surface 57. The third turning angle α3 is an angle of the document feed section 20 when the document feed section 20 has turned to the fully open position.

As shown in FIG. 8, just before the turning angle of the document feed section 20 reaches the third turning angle α3, i.e., just before the document feed section 20 is fully opened, the second raised portion 55e of the slide member 55 of the turning portion 52 moves up while sliding on the third sliding surface 57c of the cam surface 57, so that the bottom plate 55a of the slide member 55 is moved away from the support pin 53. Thus, the coil spring 56 is compressed again between the bottom plate 55a of the slide member 55 and the end plate 54a of the cylindrical frame 54 and an urging force of this compressed coil spring 56 causes the second raised portion 55e of the bottom plate 55a of the slide member 55 to be strongly pressed against the third sliding surface 57c of the cam surface 57.

Furthermore, since the third sliding surface 57c is oriented obliquely upward as shown in FIG. 5, the second raised portion 55e is subjected to an obliquely upward reaction force shown in the arrow F3. Moreover, the third sliding surface 57c is located to the right of the support pin 53. Therefore, the turning portion 52 is acted on by a counterclockwise moment about the support pin 53 and thus urged counterclockwise, so that the document feed section 20 is also urged counterclockwise.

In addition, as the turning angle of the document feed section 20 comes closer to the third turning angle α3, the bottom plate 55e is moved farther upward and father away from the support pin 53, the coil spring 56 is compressed more tightly to increase the urging force, and the second raised portion 55e of the bottom plate 55a is more strongly pressed against the third sliding surface 57c of the cam surface 57 to increase the counterclockwise moment acting on the turning portion 52.

Therefore, just before the document feed section is fully opened, a greater moment in the (counterclockwise) direction of closing of the document feed section 20 acts on the document feed section 20 as the document feed section 20 is more widely opened. Thus, the turning movement of the document feed section 20 in the direction of opening is restrained, thus lessening the impact caused on full opening of the document feed section 20.

As thus far described, in this embodiment, when the document feed section 20 is closed and when it is slightly opened, the first raised portion 55d of the bottom plate 55a of the slide member 55 slides on the first sliding surface 57a of the cam surface 57, so that the turning portion 52 is urged counterclockwise. Thus, the document feed section 20 is immediately closed and the closed state is stably maintained. Furthermore, when the document feed section 20 is half open, the first raised portion 55d of the slide member 55 slides on the second sliding surface 57b of the cam surface 57, so that the turning portion 52 is urged clockwise. Therefore, the turning angle of the document feed section 20 is approximately maintained against a moment in the (counterclockwise) direction of closing of the document feed section 20 due to its own weight, thus keeping the half-open state of the document feed section 20. Moreover, just before the document feed section is fully opened to a fully open position, the second raised portion 55e of the slide member 55 of the turning portion 52 slides on the third sliding surface 57c of the cam surface 57, so that the sliding surface 52 is urged counterclockwise. Thus, the turning movement of the document feed section 20 in the direction of opening is restrained, thus lessening the impact caused on full opening of the document feed section 20.

For example, in a structure where, as in the opening and closing device A disclosed in BACKGROUND, when the opening/closing member is largely opened, the support member abuts on the stopper to restrict the opening angle of the opening/closing member, each time the support member abuts on the stopper, the unit body, the mounting member, the opening/closing member, the support member, and so on are subjected to impact, so that screws may loosen or various components may cause displacement or other adverse effects.

Likewise, also in the opening and closing device B disclosed in BACKGROUND, when the document feeder is largely opened, the movable member abuts on the stopper of the fixed member to produce an impact, so that screws may loosen or various components may cause displacement or other adverse effects.

Unlike the above conventional techniques, in this embodiment, even when the document feed section 20 supported so as to be openable and closable with respect to the unit body is largely opened with respect to the unit body, no impact is produced.

Although in this embodiment the opening and closing device according to the present disclosure is applied to support the document feed section of the ISU so that the document feed section can be opened and closed, it may be applied to support other types of openable bodies so that they can be opened and closed.

Although the description of the above embodiment is given taking a color multifunction peripheral as one embodiment of the image forming apparatus according to the present disclosure, the embodiment is merely illustrative and the image forming apparatus may be any other image forming apparatus, including a black-and-white multifunction peripheral and other electronic devices, such as a printer, a copier, and a facsimile machine.

The structures and processing of the above embodiment described with reference to FIGS. 1 to 8 are merely illustrative of the present disclosure and the present disclosure is not intended to be limited to the above structures and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An opening and closing device comprising:
a base portion provided at a unit body;
a turning portion attached to an openable body pivotally mounted to the unit body; and
a support pin that supports the turning portion pivotally from the base portion to serve as a fulcrum for opening and closing the openable body with respect to the unit body,
the base portion including a cam surface formed around the support pin,
the turning portion including: a slide member provided movably in directions toward and away from the support pin; and an urging member urging the slide member to press the slide member against the cam surface,
the slide member being designed to slide on the cam surface while turning, together with the openable body, about the support pin,
the cam surface including: a first sliding surface to be pressed against the slide member in a range from a closed position of the openable body where the openable body is closed with respect to the unit body to a first turning angle to which the openable body has turned about the support pin from the unit body toward a fully open position of the openable body; a second sliding surface to be pressed against the slide member in a range from the first turning angle to a second turning angle to which the openable body has further turned toward the fully open position; and a third sliding surface to be pressed against the slide member in a range from the second turning angle to a third turning angle at which the openable body has turned to the fully open position,
wherein the first sliding surface presses the slide member back in a direction of closing of the openable body, the second sliding surface presses the slide member back in a direction of opening of the openable body, and the third sliding surface presses the slide member back in the direction of closing of the openable body,
when the second sliding surface presses the slide member back in the direction of opening of the openable body, the turning angle of the openable body is maintained against a moment in the direction of closing of the openable body due to an own weight of the openable body,
an end surface of the slide member facing the cam surface is provided with a first raised portion capable of sliding on the first sliding surface and the second sliding surface and a second raised portion capable of sliding on the third sliding surface,
in side view from a direction of extension of the support pin, the first and second sliding surfaces are disposed on one side of the support pin in a direction of turning of the turning portion and the third sliding surface is disposed on the other side of the support pin in the direction of turning of the turning portion,
the cam surface further includes a fourth sliding surface provided between the second sliding surface and the third sliding surface in the direction of turning of the turning portion and having a slope connecting between the second sliding surface and the third sliding surface in the side view,
the end surface of the slide member facing the cam surface is further provided with a third raised portion formed between the first raised portion and the second raised portion in the side view, and
when the turning portion turns to the second turning angle, the first raised portion abuts on the second sliding surface, concurrently the second raised portion abuts on the third sliding surface, and further concurrently the third raised portion abuts on the fourth sliding surface, so that the turning portion is supported at the cam surface.

2. An image scanner unit comprising:
a scanning section that scans an original document; and a document feed section that holds the original document placed on the scanning section, the scanning section being the unit body with which the opening and closing device according to claim 1 is used, the document feed section being the openable body with which the opening and closing device is used.

3. The opening and closing device according to claim 1, wherein the first sliding surface has a slope portion in which a surface opposing the first raised portion faces obliquely in a downward direction, and when the openable body is in the closed position, the slide member of the turning portion takes an attitude parallel to the top surface of the unit body, and the first raised portion abuts on the slope portion of the first sliding surface.

4. The opening and closing device according to claim 1, wherein when the openable body is in an attitude just before being fully opened, the second raised portion abuts on the third sliding surface.

5. The opening and closing device according to claim 4, wherein in the side view from the direction of extension of the support pin, the second raised portion has a third slope portion at a side where the first raised portion is formed, and has a fourth slope portion at the other side, the fourth slope portion is formed to be less inclined than the third slope portion, and when the openable body is in the attitude just before being fully opened, the fourth slope portion of the second raised portion abuts on the third sliding surface.

6. The opening and closing device according to claim 1, wherein in the side view from the direction of extension of the support pin, the first raised portion has a first slope portion at a side where the second raised portion is formed, and has a second slope portion at the other side, the second slope portion is formed to be less inclined than the first slope portion, and when the turning portion turns to the second turning angle, the second slope portion of the first raised portion abuts on the second sliding surface.

* * * * *